(12) United States Patent
Gindele

(10) Patent No.: US 6,731,806 B1
(45) Date of Patent: May 4, 2004

(54) REGION GROWING BASED NOISE REDUCTION METHOD FOR DIGITAL IMAGES

(75) Inventor: Edward B. Gindele, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/415,365

(22) Filed: Oct. 8, 1999

(51) Int. Cl.[7] .................................................. G06K 9/40
(52) U.S. Cl. ........................ 382/205; 382/261; 382/275
(58) Field of Search ................................. 382/261, 275, 382/205

(56) References Cited

U.S. PATENT DOCUMENTS

| 5,671,264 A | | 9/1997 | Florent et al. | |
| 6,104,839 A | * | 8/2000 | Cok et al. | 382/254 |
| 6,272,260 B1 | * | 8/2001 | Furukawa et al. | 382/261 |

FOREIGN PATENT DOCUMENTS

| WO | WO 99/30547 | 6/1999 |

OTHER PUBLICATIONS

Nieweglowski et al. "Recursive Image Filters and Space Filling Curves." IEEE Winter Workshop on Nonlinear Digital Signal Processing, 1993, pp. 4.1–5.1–4.1–5.6.*

Qian et al. "Tree–Structured Nonlinear Filters in Digital Mammography." IEEE Trans. on Medical Imaging, vol. 13, No. 1, Mar. 1994, pp. 25–36.*

Zhao et al. "Weighted–Fitting–Based Adaptive Filtering of Images." Proc. Int. Symp. on Computer Vision, Nov. 21, 1995, pp. 401–406.*

Hwang et al. "Adaptive Median Filters: New Algorithms and Results." IEEE Trans. on Image Processing, vol. 4, No. 4, Apr. 1995, pp. 499–502.*

Palubinskas et al. "Adaptive Filtering in Magnetic Resonance Images." Proc. 13th Int. Conf. on Pattern Recognition, vol. 3, Aug. 25, 1996, pp. 523–527.*

Regazzoni et al. "A New Approach to Vector Median Filtering Based on Space Filling Curves." IEEE Trans. on Image Processing, vol. 6, No. 7, Jul. 1997, pp. 1025–1037.*

Edge–Preserving Smoothing of Medical Images Using Spatially Adaptive Filters by Colin S. Poon, et al. Proceedings of the Annual International Conference of the Engineering in Medicine and Biology Society New York, IEEE US, vol. 1, Conf. 15, Oct. 28, 1993, p. 9.

Amos Lev etal, Iterative Enhancement of Noisy Images, IEEE Trans. Sysst, Man and Cybern, SCM–7, 1977, pp. 435–441.

Arce et al, Theoretial Analysis of the Max/Median Filter, IEEE Transactions, Acoustical & Speech Signal; Processing, ASSP–35(1), 1987, pp. 60–69.

Jon Son Lee, Digital Image Smoothing and the Sigma Filter, Computer Vision, Graphics and Image Processing, vol. 24, 1983, pp. 255–269.

Davis et al, Noise Cleaning by Iterated Local Averaging, IEEE Correspondence, 1978, pp. 705–710.

* cited by examiner

Primary Examiner—Jon Chang
(74) Attorney, Agent, or Firm—Raymond L. Owens

(57) ABSTRACT

A method for removing noise from a pixel of a digital image channel includes the steps of: storing an original value of the pixel of interest and using the value of the pixel of interest and neighboring contiguous pixels to determine a variable shape neighborhood region of cleaning pixels. The method further includes using the neighborhood region of cleaning pixels and the value of the pixel of interest to replace the original value of the pixel of interest with a noise cleaned pixel value.

10 Claims, 7 Drawing Sheets

REGION GROWING BASED NOISE REDUCTION METHOD FOR DIGITAL IMAGES

CROSS REFERENCE TO RELATED APPLICATION

Reference is made to commonly assigned U.S. patent application Ser. No. 09/415,374, filed Oct. 8, 1999, entitled "Removing Chroma Noise From Digital Images by Using Variable Shape Pixel Neighborhood Regions" by Edward B. Gindele, now U.S. Pat. No. 6,621,937, the disclosure of which is incorporated herein by reference.

FIELD OF INVENTION

The present invention relates to providing filtered digital images with reduced noise.

BACKGROUND OF THE INVENTION

Many noise reduction algorithms can be classified as non-linear spatial filters image processing algorithms. Most often these algorithms involve using the pixel values in a small local surrounding neighborhood to the pixel of interest combined with some form of non-linear weighting and/or statistical conditions applied to derive a noise free estimate. The small local surrounding neighborhood is usually centered on the pixel of interest. For this class of noise reduction algorithm the filter size is fixed, meaning that all image pixels are processed with the same size local surrounding neighborhood size.

An example of a fixed size noise reduction algorithm is the Sigma Filter, described by Jon Son Lee in the journal article *Digital Image Smoothing and the Sigma Filter*, Computer Vision, Graphics, and Image Processing Vol 24, p. 255–269, 1983. This is a noise reduction filter that uses a non-linear pixel averaging technique sampled from a rectangular window about the center pixel. Pixels in the local neighborhood are either included or excluded from the numerical average on the basis of the difference between the pixel and the center pixel. Mathematically, the Sigma Filter can be represented as $$q_{mn} = \Sigma_{ij} a_{ij} p_{ij} / \Sigma_{ij} a_{ij}$$

and $$a_{ij} = 1 \text{ if } |p_{ij} - p_{mn}| <= \epsilon$$

$$a_{ij} = 0 \text{ if } |p_{ij} - p_{mn}| > \epsilon$$

where $p_{ij}$ represents the pixels in the local surround about the center pixel $p_{mn}$, $q_{mn}$ represents the noise cleaned pixel, and $\epsilon$ represents a numerical constant usually set to two times the expected noise standard deviation.

The Sigma Filter was designed for image processing applications for which the dominant noise source is Gaussian additive noise. Signal dependent noise sources can easily be incorporated by making the $\epsilon$ parameter a function of the signal strength. However, for both signal independent and signal dependent noise cases the expected noise standard deviation must be known to obtain optimal results. The Sigma Filter performs well on highly structured areas due to the fact that most of the image pixels in the local neighborhood are excluded from the averaging process. This leaves high signal strength regions nearly unaltered. The filter also works well in large uniform areas devoid of image signal structure due to the fact that most of the local pixels are included in the averaging process. For these regions, the Sigma Filter behaves nearly as a low pass spatial filter.

Regions in images characterized by low amplitude signal modulation, or low signal strength, are not served well by the Sigma Filter. For these regions, most of the local pixel values are included in the averaging process thus resulting in a loss of signal modulation. Setting the threshold of the filter to a lower value does reduce the loss of signal, however, the noise is left mostly the same.

Another example of a fixed size non-linear noise filter was reported by Arce and McLoughlin in the journal article *Theoretical Analysis of the Max/Median Filter*, IEEE Transactions Acoustical & Speech Signal; Processing, ASSP-35 (1), p. 60–69, 1987 they named the Max/Median Filter. This filter separated the local surround region into four overlapping regions—horizontal, vertical, and two diagonal pixels with each region containing the center pixel. A pixel estimate was calculated for each region separately by applying a taking the statistical median pixel value, sampled from the regions' pixel values. Of these four pixel estimates, the maximum valued estimate was chosen as the noise cleaned pixel. Mathematically the Max/Median Filter can be represented as $$q_{ij} = \text{maximum of } \{Z_1, Z_2, Z_3, Z_4\}$$

$$Z_1 = \text{median of } \{p_{i,j-w}, \ldots p_{i,j}, \ldots, p_{i,j+w}\}$$

$$Z_2 = \text{median of } \{p_{i-w,j}, \ldots p_{i,j}, \ldots, p_{i+w,j}\}$$

$$Z_3 = \text{median of } \{p_{i+w,j-w}, \ldots p_{i,j}, \ldots, p_{i-w,j+w}\}$$

$$Z_4 = \text{median of } \{p_{i-w,j-w}, \ldots p_{i,j}, \ldots, p_{i+w,j+w}\}$$

Where $q_{ij}$ represents the noise cleaned pixel, Z1, Z2, Z3, and Z4 represent the four pixel estimates, and $p_{ij}$ represents the local pixel values. The Max/Median Filter also reduces the noise present while preserving edges. For Gaussian additive noise, the statistical median value does not reduce the noise by as great a factor as numerical averaging. However, this filter does work well on non-Gaussian additive noise such as spurious noise.

Noise is most visible and objectionable in images containing areas with little signal structure, e.g. blue sky regions with little or no clouds. The Sigma filter can produce a blotchy, or mottled, effect when applied image regions characterized by low signal content. This is largely due to the rectangular geometric sampling of local pixels strategy. The radial region sampling strategy employed by the Max/Median Filter produces noise reduced images will less objectionable artifacts in image regions characterized by low signal content. For images with high noise content, the artifacts produced by radial region sampling strategy have a structured appearance.

U.S. Pat. No. 5,671,264 describes a variation of the Sigma Filter and Max/Median Filter. This algorithm borrows the technique of radial spatial sampling and multiple pixel estimates from the Max/Median Filter. However, the algorithm expands the number of radial line segment to include configurations with more than four segments. The algorithm uses combinations of Sigma and Median filters to form the individual region pixel estimates. These pixel estimates derived from the N regions are then combined by numerical averaging or taking the statistical median value to form the noise cleaned pixel value. A key component of this algorithm is the randomization of one of the three essential region parameters: length, orientation, and number of regions. The randomization of the filter parameters is performed on a pixel to pixel basis thus changing the inherent characteristics with pixel location. It is claimed that the randomization feature reduces the induced structured artifacts produced by the radial region geometry sampling method. The algorithm described in U.S. Pat. No. 5,671,264 can be categorized as a variable size non-linear noise filter.

In commonly-assigned U.S. Pat. No. 6,104,839, Cok, Gray, and Matreaszek describe a method of correcting defect pixels in digital images. Although this algorithm was not intended for the reduction of noise of digital images, it employed a pixel region growing technique, that is relevant for noise reduction algorithms. In this algorithm, a defect pixel (the original pixel value has been lost by a scratch or other defect) is replaced by an estimate formed from the surrounding non-defect pixels. A pixel estimate is formed from applying a structural model to the non-defect pixel values contained in a line segment passing through the defect pixel location. Each line segment is grown in a radial direction away from the defect pixel until a statistical condition is satisfied. The line segments comprising the filter are of variable length based on the image pixel values. Multiple line segments are used and the corresponding multiple pixel estimates are used to form a defect-corrected pixel value. Unlike noise reduction algorithms, the pixel defect correction algorithm is only applied to a small collection of defect pixels. The purpose of this algorithm is the reconstruction of lost pixel or corrupted pixels.

A. Lev, S. W. Zucker, and A. Rosenfeld, described two noise reduction algorithms in their journal article *Iterative Enhancement of Noisy Images*, IEEE Trans. Sysst. Man and Cybem. SCM-7, p. 435–441, 1977. Both these algorithms were based on edge sensitive local weighted averaging techniques. In the first algorithm, local pixel weights are assigned based on the presence or non-presence of edges produced with an edge detection algorithm. Pixels located on edges do not effect the local averaging process. Additionally, non-edge pixels separated from the center pixel by an edge pixel are also excluded (given a weight of zero). In this regard, only the region of non-edge pixels surrounding the center pixel is used to form the noise free pixel estimate. The second algorithm involved a generalization of the edge detection logic that formed the local pixel weights by combining the coefficients derived from four directional gradients filters, i.e. a horizontal, vertical and two diagonal gradient filters. The output of the directional gradient filters were transformed with an exponential function and combined in a multiplicative model to form the final 3 by 3 spatial filter. This filter is actually a filter of filtered responses. Both of the Lev et. al. filters reduce noise in images but must be applied iteratively to have much effect due to small filter size (3×3). Although these filters used a fixed size local surrounding neighborhood, they did incorporate the concept of confining the pixels of consideration to a local domain about the center pixel based on a detected feature. However, the detection of that feature required the algorithm to have knowledge of pixels outside the local domain.

Fixed local surround size noise reduction filters suffer from two main problems. Algorithms employing small filter sizes take less computation time and preserve desirable low amplitude modulation signals but are also less affective at removing noise in unstructured regions. Algorithms employing large filter sizes take more computation time and are more affective at removing noise in unstructured regions but also destroy desirable low amplitude modulation signals. Radial region based noise reduction algorithms are affective at removing noise in unstructured regions but produce unwanted structured patterns in the noise cleaned images. Varying the size of the radial regions randomly can reduce the objectionability of the unwanted structured patterns but does not impact the computation time required.

SUMMARY OF THE INVENTION

It is an object of the present invention to provide a noise reduction algorithm which combines the elements of variable filter size based on image pixel data with a radial regions.

The present invention provides a noise reduction method that uses a variable shape and size filter by region growing a local neighborhood region of cleaning pixels, contiguous with the pixel of interest, based on the digital image pixel values.

This object is achieved with a method for removing noise from a pixel of a digital image channel comprising the steps of:

(a) storing an original value of the pixel of interest;

(b) using the value of the pixel of interest and neighboring contiguous pixels to determine a variable shape neighborhood region of cleaning pixels; and (c) using the neighborhood region of cleaning pixels and the value of the pixel of interest to replace the original value of the pixel of interest with a noise cleaned pixel value.

The present invention overcomes the limitation of fixed filter size algorithms by growing a region of contiguous pixels about the pixel of interest. Since the variable size and shape of the neighborhood region of cleaning pixels is based on the supplied pixel values, low amplitude image detail is preserved while minimizing the effect of induced structured artifacts. In addition, in highly structured regions of digital images, the present invention reduces the number of evaluated pixels thus reducing the computation time.

DETAILED DESCRIPTION OF THE INVENTION

A digital image is comprised of one or more digital image channels. Each digital image channel is comprised of a two-dimensional array of pixels. Each pixel value relates to the amount of light received by the imaging capture device corresponding to the physical region of pixel. For color imaging applications a digital image will often consist of red, green, and blue digital image channels. For monochrome applications, the digital image will only contain one digital image channel. Motion imaging applications can be thought of as a sequence of digital images. Those skilled in the art will recognize that the present invention can be applied to, but is not limited to, a digital image channel for any of the above mentioned applications. In fact, the present invention can be applied to any two dimensional array of noise corrupted data to obtain a noise cleaned output. Although the present invention describes a digital image channel as a two dimensional array of pixels values arranged by rows and columns, those skilled in the art will recognize that the present invention can be applied to mosaic (non rectilinear) arrays with equal effect. Those skilled in the art will also recognize that although the present invention describes replacing original pixel values with noise cleaned pixel values, it is also trivial to form a new digital image with the noise cleaned pixel values and retain the original pixel values in tact.

Figure 2:
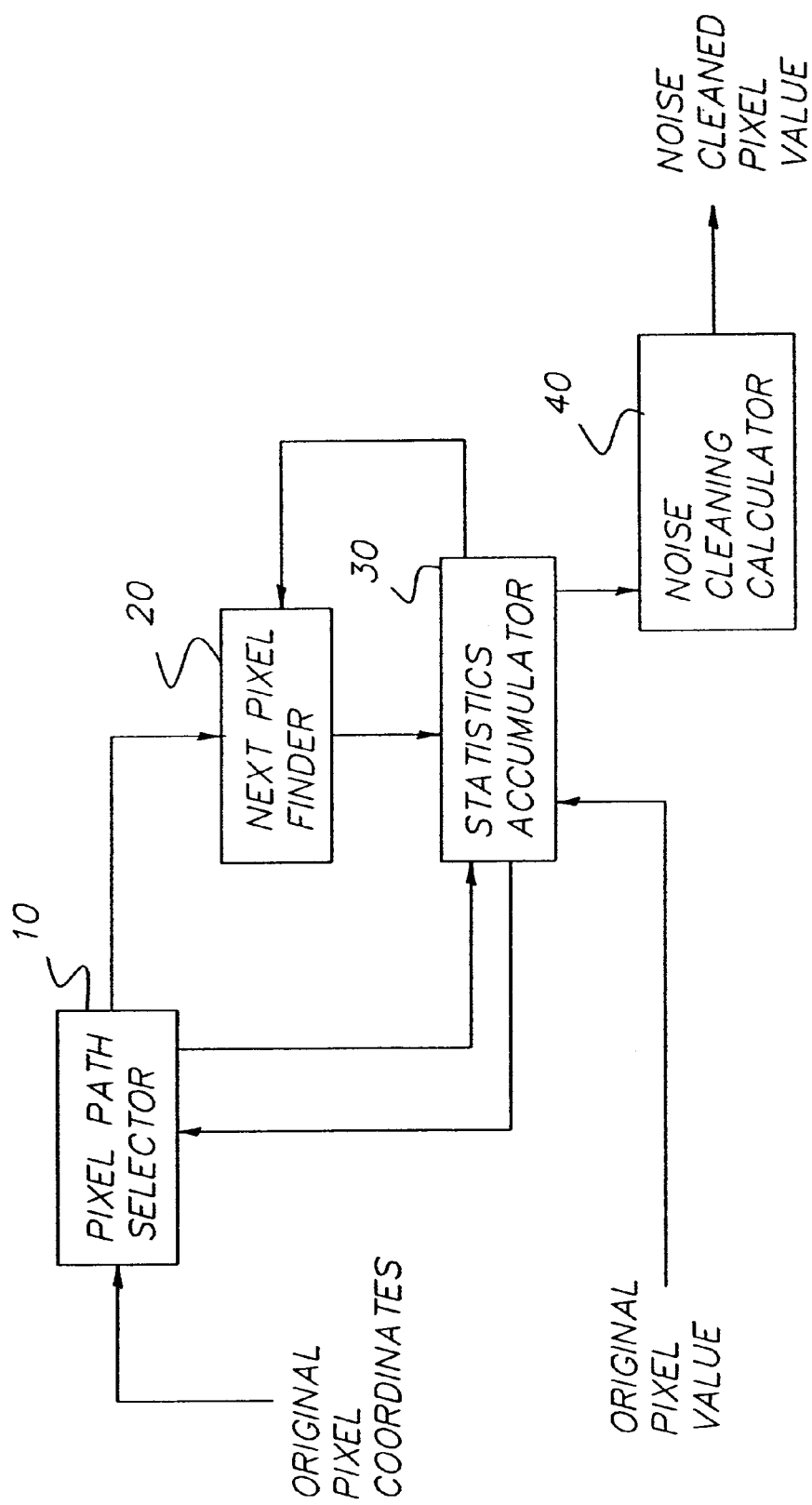
FIG. 2 is an overall block diagram of the processing flow for practicing the present invention to produce digital images with reduced noise.

FIG. 2 shows a functional block diagram of the present invention applied to a pixel of interest. A pixel has two attributes that are used: a numerical value and a location within the two-dimensional array digital image channel which will be referred to as the pixel coordinates. Pixel coordinates include two indices which correspond to the row and column location. The original value of the pixel of interest, which will be referred to as the original pixel value, is denoted by X and is input to the statistics accumulator 30. The pixel coordinates of the pixel of interest, which will be referred to as the original pixel coordinates, are input to the pixel path selector 10.

Each embodiment of the present invention contains one or more pixel processing paths each having a predetermined route of contiguous pixels. The pixel path selector 10 keeps track of which pixel processing path is currently being processed and sends an index indicating the current pixel processing path to the next pixel finder 20. The next pixel finder 20 determines the next sequential pixel to be evaluated. This is accomplished by retrieving the next sequential pixel of the current pixel processing path. The value of the next sequential pixel is fed to the statistics accumulator 30 which uses it to determine if the next sequential pixel should be included in the neighborhood region of cleaning pixels constituting a variable shape contiguous collection of pixels surrounding the pixel of interest.

The processing of pixels by the statistics accumulator 30 is complete when the last pixel processing path is completed. Each pixel processing path is completed when one or more pixel path ending conditions are satisfied. Examples of pixel path ending conditions are: the location of the next sequential pixel lies outside the boundary of the two-dimensional array of pixels of the digital image channel, the total number of pixels processed by the statistics accumulator 30 has reached a maximum allowable number, the total number of pixels processed by the statistics accumulator 30 on the current pixel processing path has reached a maximum allowable number, and the noise cleaned pixel value output by the statistics accumulator 30 has not changed from its previous value by more than an allowable difference. When the statistics accumulator 30 determines that a pixel path ending condition has been satisfied, a signal is sent to the pixel path selector 10 to increment the index of the current pixel processing path.

When the processing of all the pixel processing paths is complete, the neighborhood region of cleaning pixels for the pixel of interest is defined. The neighborhood region of cleaning pixels is input to the noise cleaning calculator 40 which uses some or all of the neighborhood region of cleaning pixels to calculate a noise cleaned pixel value. The noise cleaned pixel value replaces the original value of the pixel of interest providing a pixel value with less inherent noise. This process is repeated for all the pixels in the digital image channel. Thus with the application of the present invention the noise in the original digital image channel is removed.

It is important to note that since each individual pixel processing path is contiguous with the pixel of interest, so too is the neighborhood region of cleaning pixels. The present invention differs from all previous inventions in that the neighborhood region of cleaning pixels, which the noise cleaned pixel value is calculated from, is contiguous with the pixel of interest, variable in shape, with a shape which is completely determined by the pixel values contained in the original digital image channel.

Figure 3:
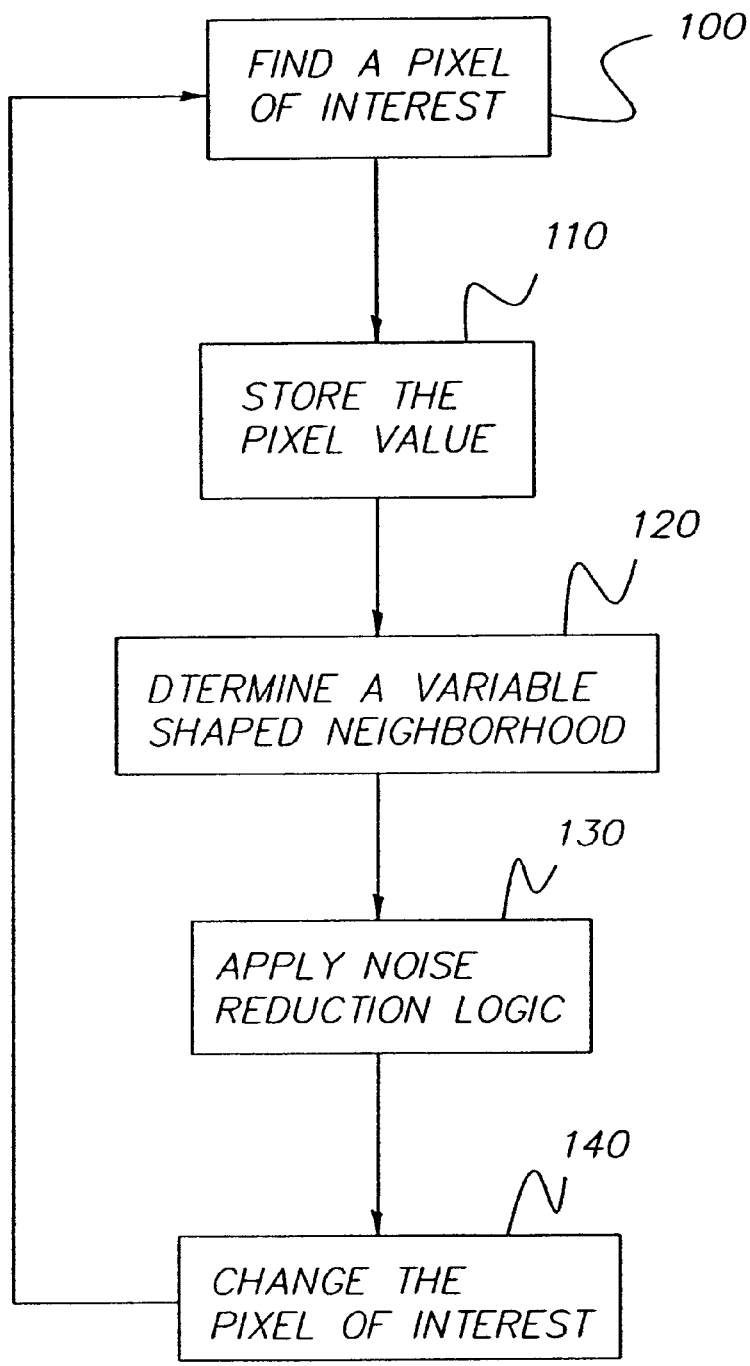
FIG. 3 shows a flow chart of an algorithm which can accomplish all the processes of FIG. 2.

Referring to FIG. 3, a flow chart in block diagram form of an algorithm is shown which can practice the present invention as depicted in FIG. 2. The processing steps begin with block 100 which shows the step of finding a pixel of interest. The preferred embodiment of the present invention starts with the first pixel in computer memory at the first column and the first row. Block 110 shows the step of storing the original value of the pixel of interest. Block 120 shows the step of determining a variable shaped neighborhood region of cleaning pixels. This is performed by using the stored value of the pixel of interest and the values of pixel located in a local neighborhood about the pixel of interest. Block 130 shows the processing step where a noise cleaned pixel value is calculated from the values of pixels included in the variable shaped neighborhood region of cleaning pixels and the stored value of the pixel of interest with the application of noise reduction logic. Block 140 shows the processing step of replacing the original value of the pixel of interest with the noise cleaned pixel value. The processing procedure then continues to block 100 where a new pixel of interest is found. The preferred embodiment of the present invention finds the next sequential pixel in memory as the next pixel of interest to be processed. The processing steps shown by blocks 100, 110, 120, 130, and 140 are repeated for each pixel of interest to be processed. The preferred embodiment of the present invention repeats these processing steps for all pixels in the digital image channel and for all digital image channels in the digital image.

Figure 4:
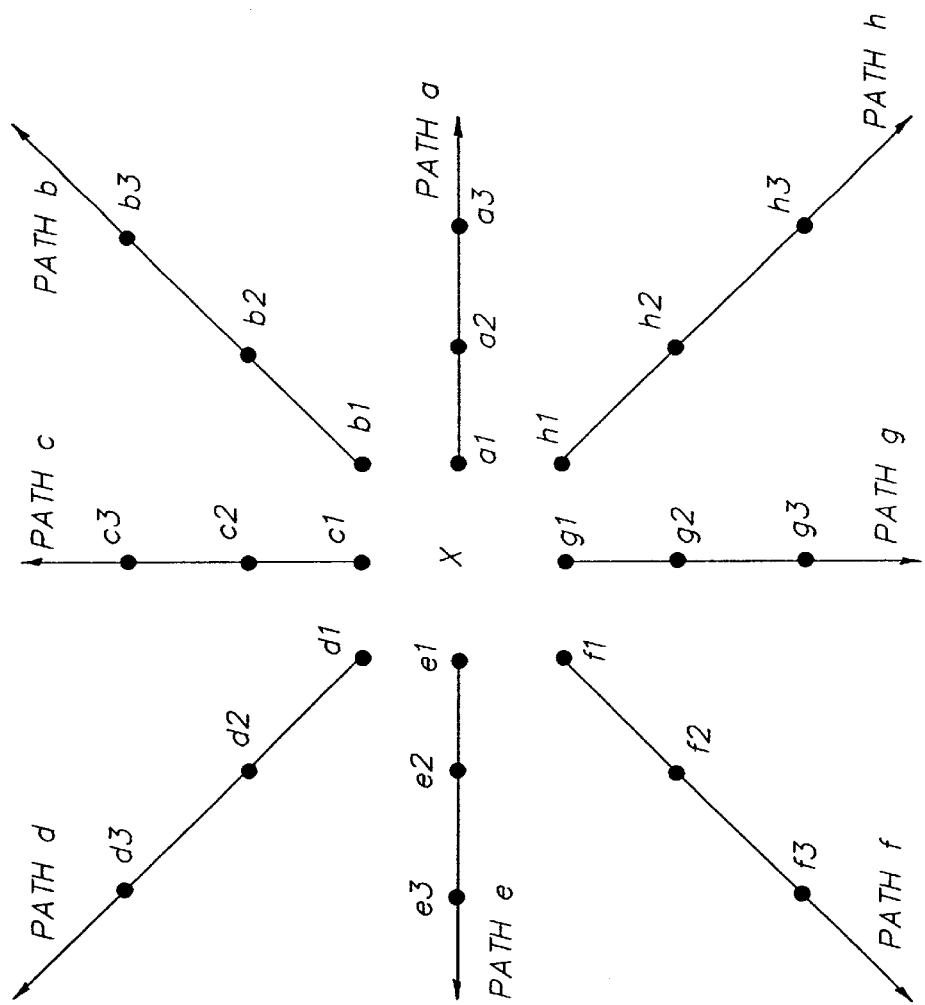
FIG. 4 is a diagram of the radial path configuration used by the present invention.

Many possible pixel processing paths can be constructed. The preferred embodiment of the present invention employs a set of eight radially oriented pixel processing paths depicted in FIG. 4. In this regard, the eight pixel processing paths are disposed along radial directions in relation to the pixel of interest. This collection of pixel processing paths will be called the radial path configuration. These eight pixel processing paths are labeled A, B, C, D, E, F, G, and H with sequential pixels processed in each pixel processing path labeled 1, 2, 3, and so on. Each pixel processing path starts at an adjacent pixel coordinate to the original pixel coordinate. As an example, path a shown in FIG. 4 starts by sending the pixel value corresponding to pixel location a1 to the statistics accumulator 30. If after processing this pixel value no pixel path ending condition is satisfied, the next pixel processed will be located at a2.

Figure 1:
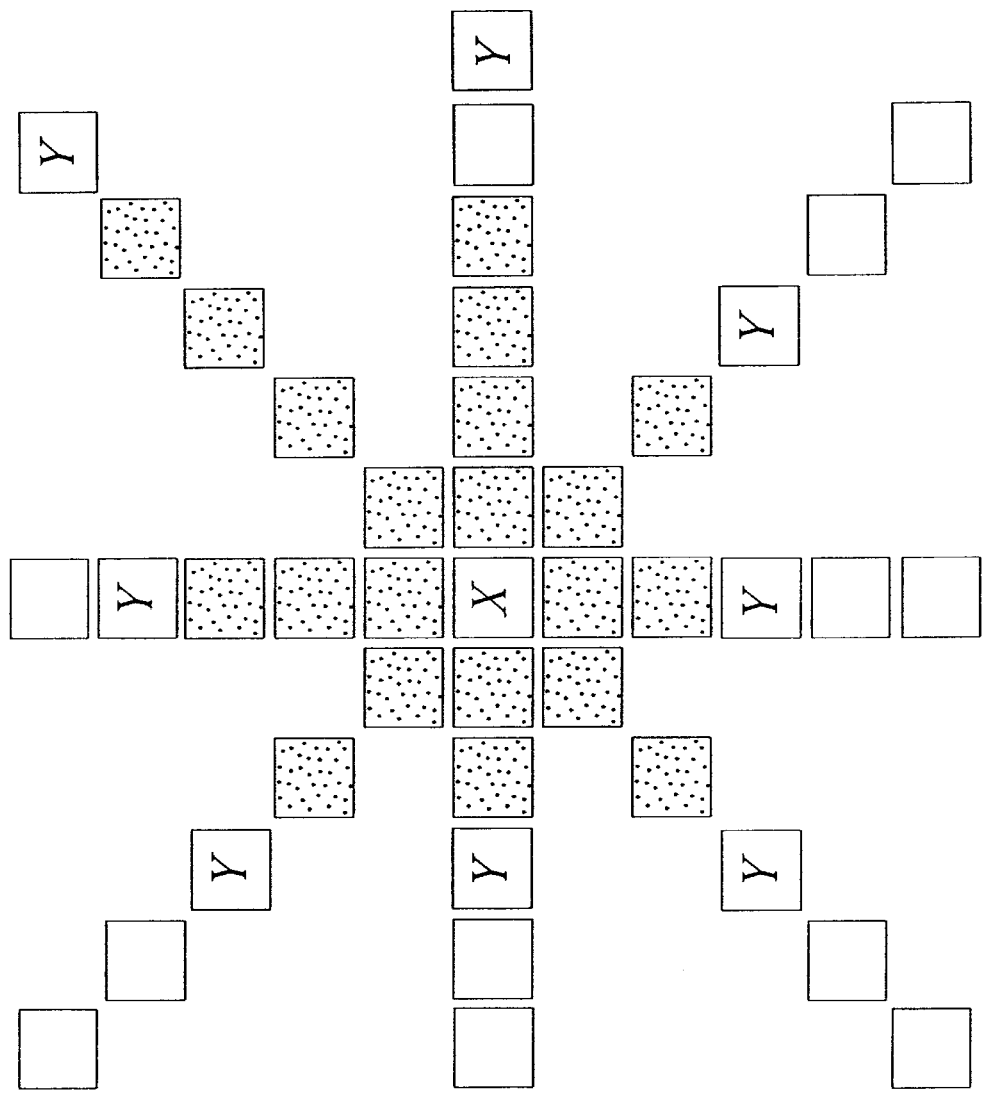
FIG. 1 is an example of the variable shape and size of the neighborhood region of cleaning pixels that can result from the application of the preferred embodiment of the present invention.
Figure 5:
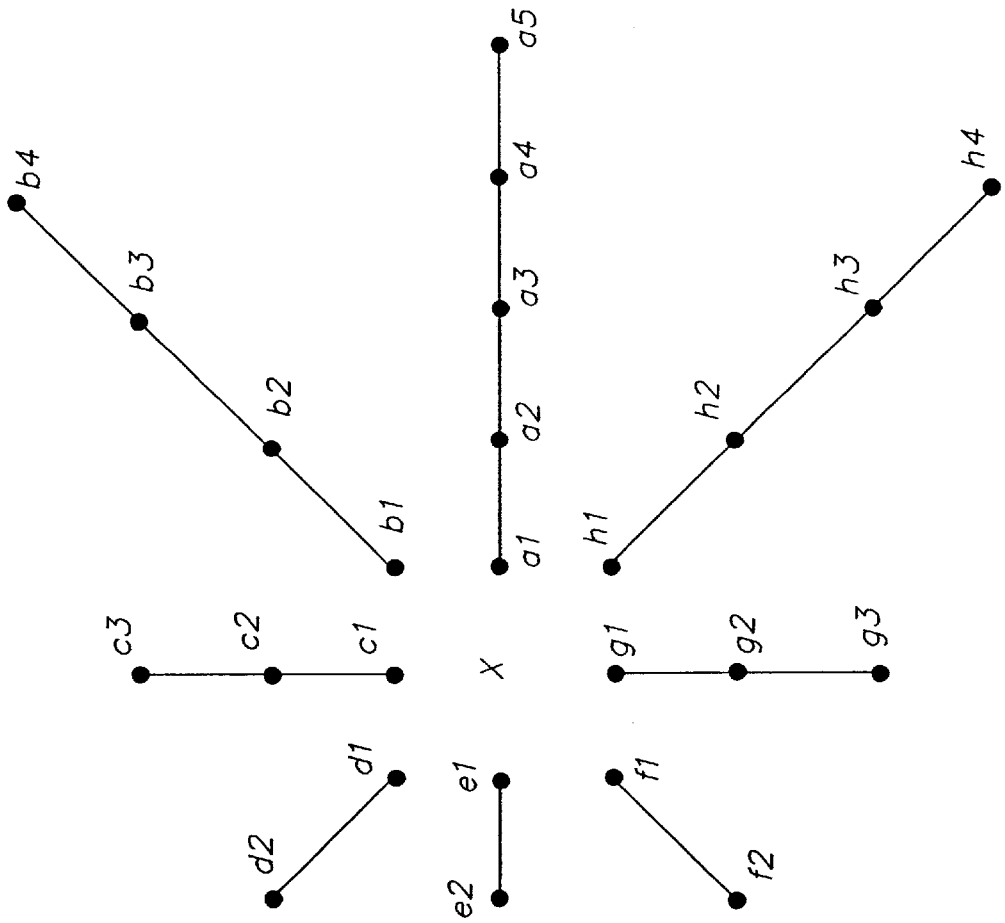
FIG. 5 is a diagram of the area fill propagation paths used by an alternative embodiment of the present invention.

Since each pixel processing path must satisfy a pixel path ending condition and the pixel path ending conditions can be based on the underlying pixel values encountered, the number of pixels processed in each pixel processing paths is allowed to vary. FIG. 5 illustrates an example of a pixel region that can result using the radial path configuration. In this example the pixel path ending condition for each of the eight pixel processing paths a through h was satisfied at pixel locations a6, b5, c4, d3, e3, f3, g4, and h4 respectively. The effective size and shape of the neighborhood region of cleaning pixels thus changes based on when the pixel path ending condition is satisfied for each individual pixel processing path. FIG. 1 illustrates the effective size and shape of the neighborhood region of cleaning pixels corresponding to the example shown in FIG. 4. The pixel marked X is the location of the pixel of interest. The pixels marked Y represent the pixel locations a6, b5, c4, d3, e3, f3, g4, and h4 for which the pixel path ending condition was satisfied for each individual pixel processing path.

Figure 6:
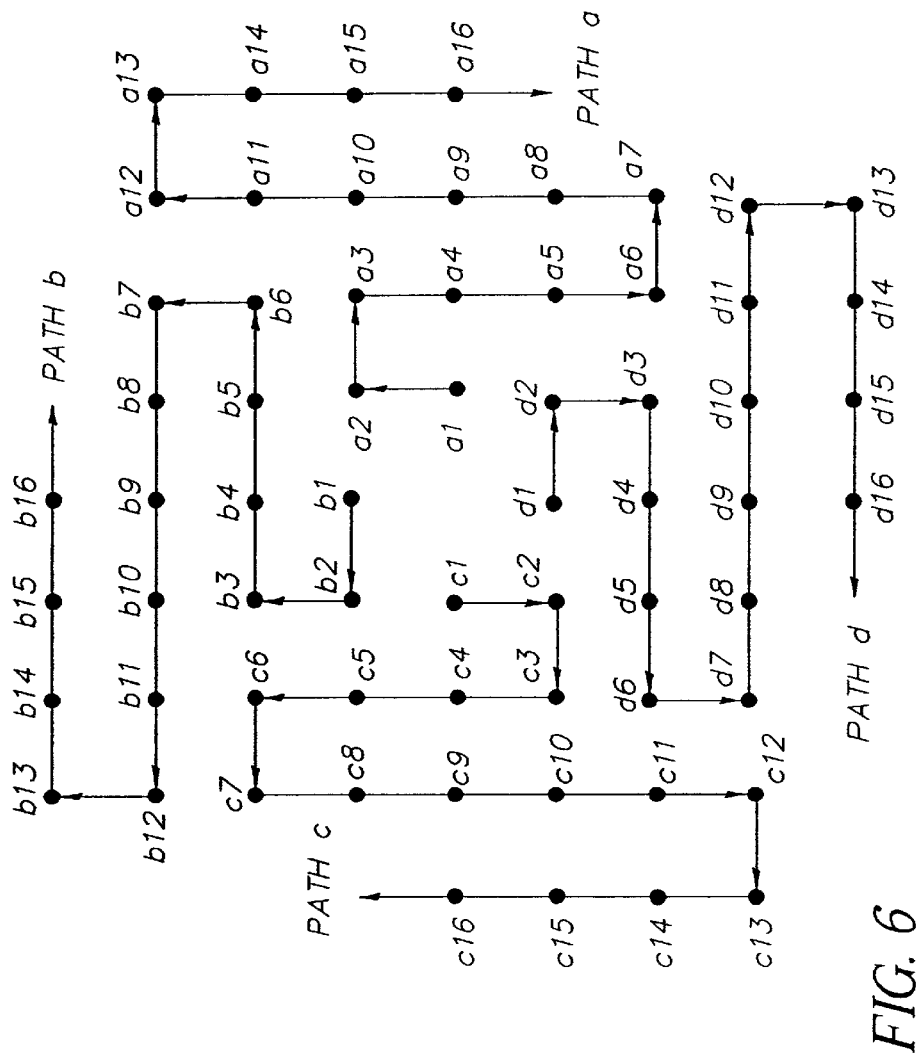
FIG. 6 is a diagram of the area fill path configuration used by an alternative embodiment of the present invention.
Figure 7:
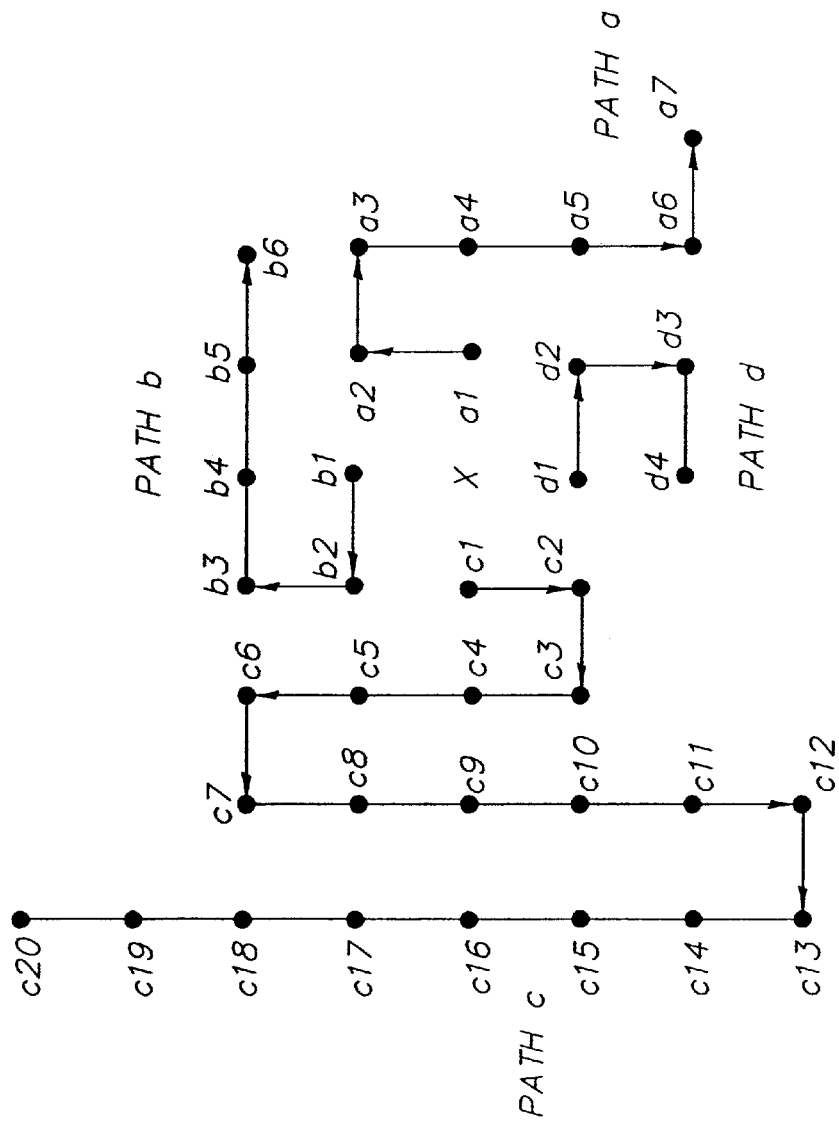
FIG. 7 is an example of the variable shape and size of the neighborhood region of cleaning pixels that can result from the application of an alternative embodiment of the present invention.

An alternative embodiment of the present invention has a different set of pixel processing paths shown in FIG. 6. This set of four pixel processing paths will be called the area fill path configuration. Each pixel processing path starts out at a pixel location adjacent to the pixel of interest. The first pixel processing path designated as path A, is defined by a series of vertical and horizontal steps. Starting with pixel a1, the second pixel to be evaluated is a located above pixel a1. Since this pixel lies on a diagonal line emanating from the pixel of interest, the route of path A proceeds to the right to evaluate pixel a3. Path A continues down until it reaches another pixel located on a diagonal line emanating from the pixel of interest. The other pixel processing paths B, C, and D follow the same logic but cover the pixel locations above, to the left and below the pixel of interest respectively. FIG. 7 illustrates an example neighborhood region of cleaning pixels that can result with the application of the area fill path configuration. The pixel path ending condition was satisfied at pixels locations a8, b7, c21, and d5 for the individual pixel processing paths.

The area fill path configuration does not leave any gaps, or missing pixel locations surrounding the pixel of interest while the radial path configuration does. Both of these embodiments constitute a region growing based noise filter. The effective size and shape of the noise filter depends on the choice of pixel processing paths but more importantly on the processed pixel values.

U.S. Pat. No. 5,671,264 describes a noise filter which relies on a set of radially oriented regions constituting a neighborhood region of cleaning pixels. A key aspect of this algorithm is based on the radomization of one of three attributes of the radially oriented neighborhood region of cleaning pixels: the number of regions, the length of the regions, and the orientation angle of the regions. By randomizing one or more of these attributes it is claimed in U.S. Pat. No. 5,671,264 that the resulting noise cleaned image is improved. The method described in U.S. Pat. No. 5,671,264 does constitute a variable size and shape noise filter. However, the variable size and shape of the noise filter is based not of the digital image pixel values but by a random number generator.

The algorithms described by A. Lev, S. W. Zucker, and A. Rosenfeld, in their journal article *Iterative Enhancement of Noisy Images*, IEEE Trans. Sysst. Man and Cybem. SCM-7, p. 435–441, 1977 can also be considered to be a variable size noise filter. In these algorithms some of the pixels are excluded from contributing to the calculation of the noise cleaned pixel value based on presence of detected edge information. However, in Lev et. al's algorithm all of the pixel values within a fixed size and shape filter region must be evaluated before the excluded pixels can be identified. In this regard, the Lev et. al algorithm can be considered a fixed size noise filter with variable pixel value weights.

The preferred embodiment employs a pixel path ending condition, used by the statistics accumulator 30, and a method for calculating the noise cleaned pixel value based, used by the noise cleaning calculator 40, based on the Sigma Filter, described by Jon Son Lee in the journal article *Digital Image Smoothing and the Sigma Filter*, Computer Vision, Graphics, and Image Processing Vol 24, p. 255–269, 1983. Pixel values sent to the statistics accumulator 30 shown in FIG. 2 are compared with the value of the pixel of interest. If the difference between the value of the next sequential pixel and the value of the pixel of interest is less than a threshold $\epsilon$, the next sequential pixel is included in the neighborhood region of cleaning pixels and by the noise cleaning calculator to calculate a numerical average which forms the noise cleaned pixel value. The numerical constant c is usually set to two times the expected noise standard deviation. Mathematically, the numerical average can be expressed as $$q_{mn} = \Sigma_{ij} a_{jk} p_{jk} / \Sigma_{jk} a_{jk}$$

and $$a_{jk} = 1 \text{ if } |p_{jk} - p_{mn}| <= \epsilon$$

$$a_{jk} = 0 \text{ if } |p_{jk} - p_{mn}| > \epsilon$$

where $p_{jk}$ represents the $k^{th}$ sequential pixel in the $j^{th}$ pixel processing path, $p_{mn}$ represents the value of the pixel of interest located at row m and column n, and $q_{mn}$ represents the noise cleaned pixel value. Thus the noise cleaned pixel value is based on the difference between the value of the pixel of interest and the values of pixels and is represented by the statistical mean of the values of the pixels contained in the neighborhood of cleaning pixels. The pixel path ending condition for each pixel processing path is based on the number N of excluded pixels (pixels for which $a_{jk}$ equals zero) in the individual pixel processing path expressed as $$N = k - \Sigma_{jk} a_{jk}$$

The variable k represents the number of processed next sequential pixel values encountered in the current pixel processing path. When the number of excluded pixels N is equal to a predetermined threshold T, the pixel path ending condition for the pixel processing path is satisfied. The preferred embodiment of the present invention uses a value of two for the predetermined threshold T. This pixel processing path ending condition thus determines the length of the predetermined pixel processing path, including paths disposed along radial directions, based on the difference of the value of the pixel of interest and the values of the pixels contained in the pixel processing path.

It should be noted that while the preferred embodiment of present invention uses the same numerical value for $\epsilon$ to determine the noise cleaned pixel value $q_{mn}$ and the pixel path ending condition, this does not have to be the case. The preferred embodiment uses the same value for $\epsilon$ for simplicity and computational efficiency. If the source of noise is signal dependent, i.e. depends on the value of the pixel of interest $p_{mn}$, the value of $\epsilon$ should track with $p_{mn}$. An alternative embodiment of the present invention uses a look-up-table of $\epsilon$ values. As each pixel of interest is processed, the value of $p_{mn}$ is used as an index into the look-up-table of $\epsilon$ values to set the current value of $\epsilon$.

The preferred embodiment also uses the boundary of the digital image channel as a pixel path ending condition for the pixel processing paths. This must be used since there is no pixel data beyond the boundary. Another pixel path ending condition used by the preferred embodiment is a maximum number of pixels for each pixel processing path. Typically a maximum of 15 pixels for each pixel processing path is used.

The pixel inclusion/exclusion logic of Lee's Sigma Filter can be represented mathematically as $$q_{mn} = \Sigma_{ij} a_{ij} p_{ij} / \Sigma_{ij} a_{ij}$$

and $$a_{ij}=1 \text{ if } |p_{ij}-p_{mn}| <= \epsilon$$
$$a_{ij}=0 \text{ if } |p_{ij}-p_{mn}| > \epsilon$$

where $p_{ij}$ represents the pixels in the local surround about the original pixel $p_{mn}$, $q_{mn}$ represents the noise cleaned pixel, and $\epsilon$ represents a numerical constant usually set to two times the expected noise standard deviation. The Sigma Filter as described by Lee was applied to a fixed size rectangular pixel region centered about the original pixel.

An alternative embodiment of the present invention uses a median filter to calculate the noise cleaned pixel value produced by the noise cleaning calculator 40. In this embodiment, the same pixel path ending conditions are used as in the preferred embodiment. Therefore the neighborhood region of cleaning pixels is determined by the Sigma filter mathematics. The noise cleaned pixel value is given by the statistical median of the pixel values contained in the neighborhood region of cleaning pixels.

The present invention can be provided in a computer program which is stored on a computer readable storage medium. Such a medium can comprise for example; a magnetic disk (such as a floppy disk), magnetic tape, code bars, solid state electronic storage devices (such as random access memories or read only memories), or any other physical device or medium which can be employed to store a computer program.

The invention has been described in detail with particular reference to certain preferred embodiments thereof, but it will be understood that variations and modifications can be effected within the spirit and scope of the invention.

PARTS LIST

10 pixel path selector
20 next pixel finder
30 statistics accumulator
40 noise cleaning calculator

What is claimed is:

1. A method for removing noise from a pixel of a digital image channel comprising the steps of:

(a) storing an original value of the pixel of interest;

(b) using the value of the pixel of interest and neighboring contiguous pixels to determine a variable shape neighborhood region of cleaning pixels; wherein the neighborhood region of cleaning pixels is chosen from one or more predetermined pixel processing paths contiguous with the pixel of interest; and the length of the predetermined pixel processing paths is based on the difference of the value of the pixel of interest and the values of the pixels contained in the pixel processing paths; and (c) using the neighborhood region of cleaning pixels and the value of the pixel of interest to replace the original value of the pixel of interest with a noise cleaned pixel value.

2. The method of claim 1 wherein step (c) further comprises calculating a noise cleaned pixel value based on the difference between the value of the pixel of interest and the values of the pixels contained in the neighborhood of cleaning pixels.

3. The method of claim 1 wherein step (c) further comprises calculating a noise cleaned pixel value based on the statistical mean of the values of the pixels contained in the neighborhood of cleaning pixels.

4. A method for removing noise on a pixel by pixel basis from pixels of a digital image channel comprising the steps of:

(a) storing an original value of the pixel of interest;

(b) using the value of the pixel of interest and neighboring contiguous pixels to determine a variable shape neighborhood region of cleaning pixels;

(c) using the neighborhood region of cleaning pixels and the value of the pixel of interest to change the original value of the pixel of interest so that it has been noise cleaned; and calculating a noise cleaned pixel value based on the difference between the value of the pixel of interest and the values of the pixels contained in the neighborhood of cleaning pixels; and (d) repeating steps (a)–(c) for other pixels of interest.

5. A method for removing noise from a pixel of a digital image channel comprising the steps of:

(a) storing an original value of the pixel of interest;

(b) using the value of the pixel of interest and neighboring contiguous pixels to determine a variable shape neighborhood region of cleaning pixels; wherein the neighborhood region of cleaning pixels is chosen from one or more predetermined pixel processing paths contiguous with the pixel of interest that are disposed along radial directions in relation to the pixel of interest; and the length of the pixel processing paths is based on the difference of the value of the pixel of interest and the values of the pixels contained in the predetermined pixel processing paths; and (c) using the neighborhood region of cleaning pixels and the value of the pixel of interest to replace the original value of the pixel of interest with a noise cleaned pixel value.

6. The method of claim 5 wherein step (c) further comprises calculating a noise cleaned pixel value based on the difference between the value of the pixel of interest and the values of the pixels contained in the neighborhood of cleaning pixels.

7. The method of claim 5 wherein step (c) further comprises calculating a noise cleaned pixel value based on the statistical mean of the values of the pixels contained in the neighborhood of cleaning pixels.

8. A method for removing noise from a pixel of a digital image channel comprising the steps of:

(a) storing an original value of the pixel of interest;

(b) using the value of the pixel of interest and neighboring contiguous pixels to determine a variable shape neighborhood region of cleaning pixels; and (c) using the neighborhood region of cleaning pixels and the value of the pixel of interest to replace the original value of the pixel of interest with a noise cleaned pixel value and calculating a noise cleaned pixel value based on the difference between the value of the pixel of interest and the values of the pixels contained in the neighborhood of cleaning pixels.

9. A method for removing noise from a pixel of a digital image channel comprising the steps of:

(a) storing an original value of the pixel of interest;

(b) using the value of the pixel of interest and neighboring contiguous pixels to determine a variable shape neighborhood region of cleaning pixels; wherein the neighborhood region of cleaning pixels is chosen from one or more predetermined pixel processing paths contiguous with the pixel of interest; and (c) using the neighborhood region of cleaning pixels and the value of the pixel of interest to replace the original value of the pixel of interest with a noise cleaned pixel value based on the difference between the value of the pixel of interest and the values of the pixels contained in the neighborhood of cleaning pixels.

10. A method for removing noise from a pixel of a digital image channel comprising the steps of:

(a) storing an original value of the pixel of interest;

(b) using the value of the pixel of interest and neighboring contiguous pixels to determine a variable shape neighborhood region of cleaning pixels; wherein the neighborhood region of cleaning pixels is chosen from one or more predetermined pixel processing paths contiguous with the pixel of interest that are contiguous with the pixel of interest and disposed along radial directions in relation to the pixel of interest; and (c) using the neighborhood region of cleaning pixels and the value of the pixel of interest to replace the original value of the pixel of interest with a noise cleaned pixel value based on the difference between the value of the pixel of interest and the values of the pixels contained in the neighborhood of cleaning pixels.

* * * * *